D. SHERWOOD.
Coffee Strainer.
No. 32,791.
Patented July 9, 1861.
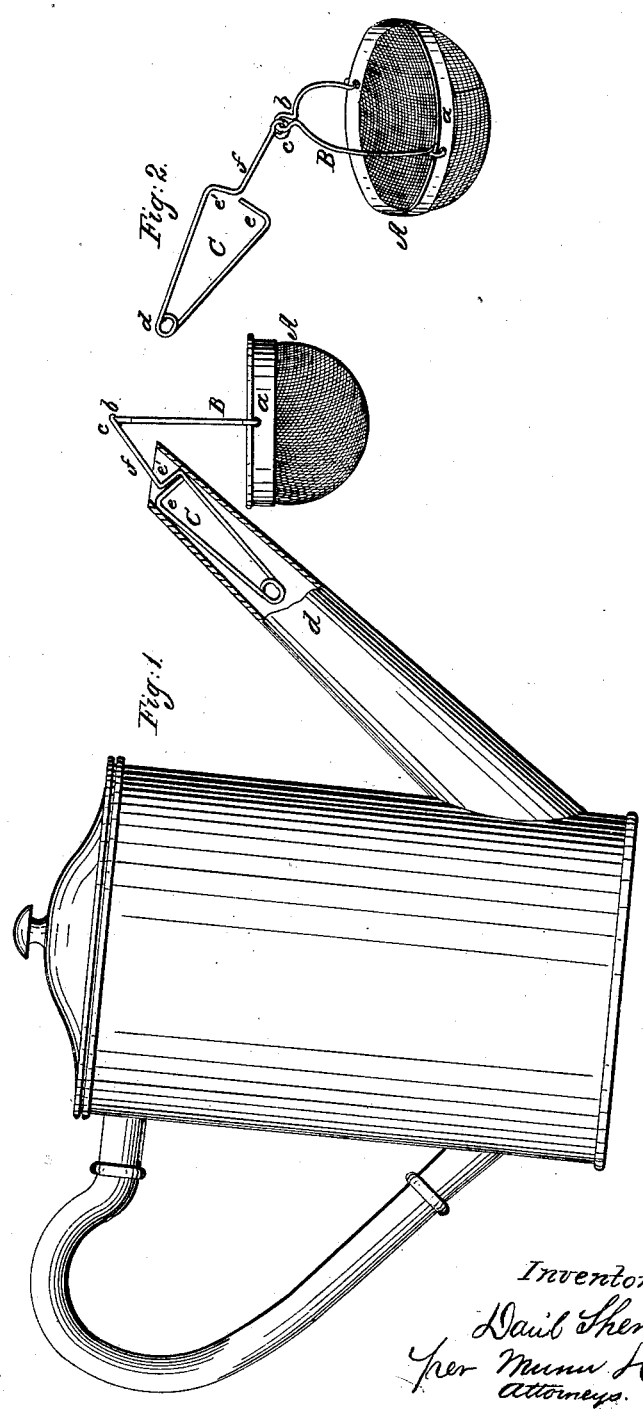

UNITED STATES PATENT OFFICE.

DANIEL SHERWOOD, OF LOWELL, MASSACHUSETTS.

COFFEE-STRAINER.

Specification forming part of Letters Patent No. 32,791, dated July 9, 1861; Reissued April 5, 1870, No. 3,908.

*To all whom it may concern:*

Be it known that I, DANIEL SHERWOOD, of Lowell, in the county of Middlesex and State of Massachusetts, have invented a new and Improved Coffee-Strainer; and I do hereby declare that the following is a full, clear, and exact description thereof, reference being had to the accompanying drawings, making a part of this specification, in which—

Figure 1 shows the application of my improved strainer to a coffee pot spout. Fig. 2 is a perspective view of the strainer and spring fastening attached to it.

Similar letters of reference indicate corresponding parts in both figures.

The object of this invention is to attach to the mouth of the spout of a coffee pot a small straining cup for straining the coffee as it is poured from the pot; said cup being so attached that it can be readily removed and replaced at pleasure.

The nature of my invention consists in pivoting to the center of the bail of a small strainer a wire spring which is bent in such a manner as to fit into the mouth of a coffee pot spout and attach the strainer thereto, so that when the coffee is poured from the pot it will pass through the strainer free from grounds, as will be hereinafter explained.

To enable those skilled in the art to make and use my invention I will proceed to describe its construction and operation.

A represents the strainer which is a hemispherical shaped cup made of fine wire-cloth secured to a rim *a*. This cup is quite small as it is only required to receive and allow the stream of liquid poured from the coffee pot. A bail B, is attached to the rim *a*, and an eye *b*, is formed in the middle of this bail; to which eye the spring C, is attached by a loop *c*. This spring C, is formed of a piece of steel wire bent in a forked shape with a coil or two at *d*, which forms the spring for spreading the fork outward. The end *e*, of one of the prongs is bent inward and the main stem of the spring is bent at *e'*, so that the portion *f*, will be in the center of the spring, thus holding the center of cup A, directly under the mouth of the coffee pot spout when attached thereto. The length of the bent portions *e*, *e'*, should be such as to allow the spring C, to be compressed sufficiently to pass well into the mouth of the coffee pot spout, then when the spring is released and allowed to expand the angles formed by the bent portions *e*, *e'*, will press outward against the inside surfaces of the spout and retain the spring within the spout, with the cup A, hanging from the end of the projecting wire *f*, as shown in Fig. 1 of the drawings. The spring C, being made of fine wire it will not obstruct the free flow of liquid through the spout of the coffee pot. The cup A, being attached to the spout by the friction of the spring C, it will be seen that this spring and strainer can be removed or replaced at pleasure.

As the spouts of coffee pots generally taper toward their outer ends the spring C, will have sufficient retaining power to hold tightly to the spout when properly attached, and prevent the cup A from becoming casually detached in pouring out the liquid.

Having thus described my invention I claim as a new and improved article of manufacture—

The wire spring C, formed as herein shown and attached to the strainer A, for the purposes set forth.

DANIEL SHERWOOD.

Witnesses:
G. FRANK SHEPARD,
HENRY HARRINGTON.